July 24, 1934.    R. W. THOMAS    1,967,981
POSITIVE CHECK VALVE
Filed Feb. 20, 1931    2 Sheets-Sheet 2

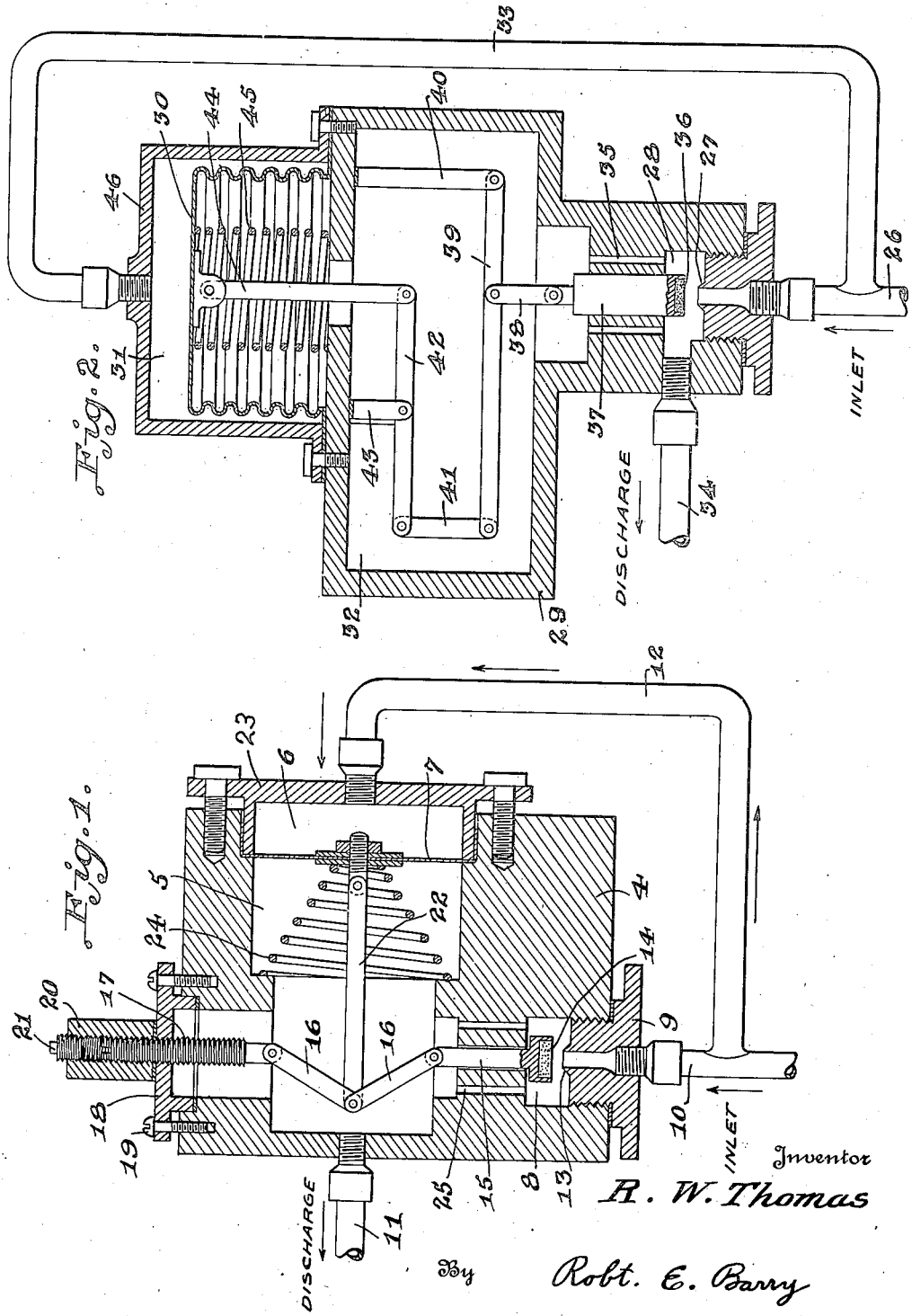

Inventor
R. W. Thomas
By  Robt. E. Barry
Attorney

Patented July 24, 1934

1,967,981

UNITED STATES PATENT OFFICE 1,967,981

POSITIVE CHECK VALVE

Rosswell W. Thomas, Detroit, Mich., assignor to Phillips Petroleum Company, Bartlesville, Okla., a corporation of Delaware Application February 20, 1931, Serial No. 517,337

6 Claims. (Cl. 137—153)

This invention relates to improvements in positive check valves, and while the embodiments described herein have been designed particularly for use with air-gas machine, I desire to be understood that such valves may be employed in any environment where it is desired to prevent back flow of a fluid.

In working in connection with air-gas machines, a very considerable amount of difficulty is had due to variation in calorific value, owing to the fact that the gas or air pressure, (3 to 7 pounds) in the gas storage chamber, or vaporizing compartment, causes the fluid to leak back through the hydrocarbon discharge line check valve and through the pump discharge valve, into the hydrocarbon tank, when the pump is not running at frequent intervals. In other words, if the machine is shut down for say, two or three hours, and then started up again, as is the case in actual domestic or commercial practice, the finished gas gradually leaks back through the valves and displaces some of the hydrocarbon in the hydrocarbon pump discharge line. The next time the pump makes a stroke, instead of delivering its normal charge of hydrocarbon fluid into the air line and the vaporizing chamber, it delivers less than the normal charge, due to the return flow of fluid through the leaky valves, or in other words, part of the liquid discharged by the pump is used to replace that which has previously leaked out of the discharge line, and only the excess amount goes into the gas making chamber. At first glance, it would appear that this might be remedied by simply using known types of check valves. However, with a view of overcoming the difficulty, I experimented with a metal to metal seat check valves of the ball type, the swing type, the globe lift type, etc., and I also used the globe lift type check valves with soft seat disks or rings seating on a projecting sharp metal nozzle. All such valves leaked more or less, particularly after having been in service for a day or two.

I also tried submerging check valves within a liquid seal, and this arrangement has proven successful to some extent but has not been entirely positive and leak proof.

Consequently, I have designed a positive seating check valve which will not require the use of any liquid sealing medium. At the low pressures at which some gas machines work, there is insufficient seat pressure on an ordinary check valve to make a tight seal, therefore, I determined to load the new check valve by means of a differential diaphragm. In experimenting, however, with a valve associated with a diaphragm, I found that it would not operate successfully unless some means of reversing the direction of travel between the diaphragm and the valve seat was provided. Means for accomplishing such reversal of direction may be provided for in many ways, and in the accompanying drawings, I have illustrated several embodiments of such means.

All of these mechanisms have the added advantage over merely reversing the direction of travel, in that it is possible, by arranging the disposition of the links and fulcrums properly to obtain any desired ratio of travel, and therefore of seat pressure between the diaphragm actuated valve head and the valve seat itself.

Referring to the accompanying drawings,

Fig. 1 is a sectional view of one form of the improved valve.

Figs. 2 and 3 are similar views of other forms of the apparatus.

Figure 3:
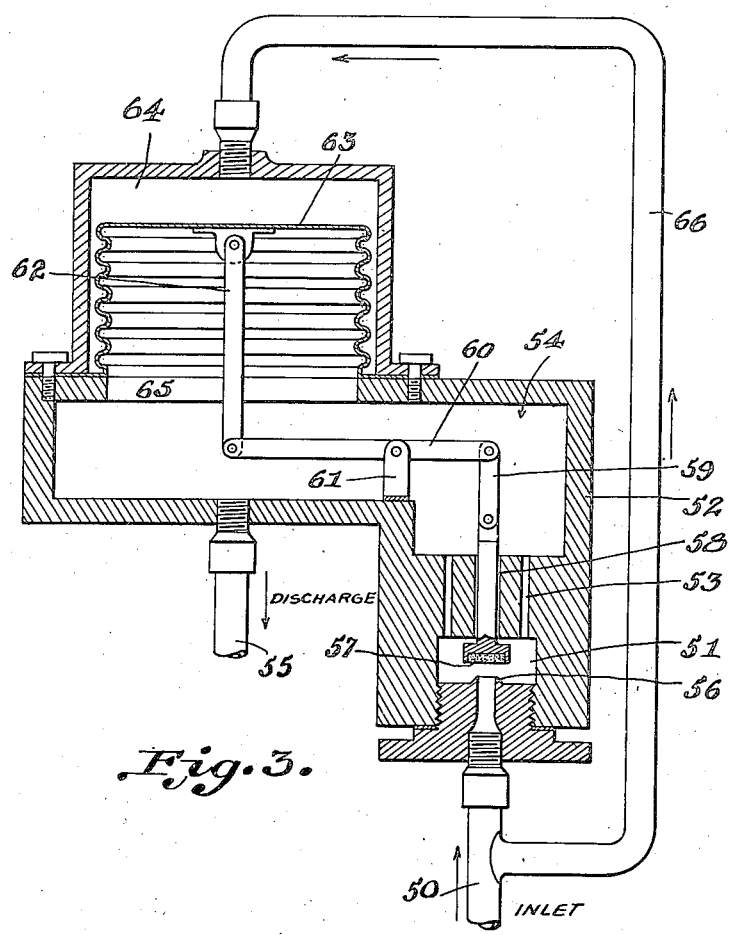

In the embodiment illustrated in Fig. 1, 4 designates a valve casing having an internal chamber that is divided into two compartments 5 and 6 by an imperforate movable partition 7 which may be of the flexible bellows, or solid piston type. An inlet port 8 leads into the chamber and is provided with a threaded plug 9 that is connected to a pipe 10 leading from the point where pressure is placed on the fluid for forcing the fluid through the chamber to the discharge pipe 11 that leads to a suitable point for storage of the fluid under pressure.

A branch pipe 12 places the pipe 10 anterior to the chamber, in communication with the compartment 6, so that the pressure existing in the intake pipe is always imparted to one side of the diaphragm 7.

The discharge end of the pipe 10 terminates in a valve seat 13 that cooperates with a valve head or disk 14, arranged at one end of a stem 15 which is guided by a portion of the casing.

Toggle links 16 pivotally connect the other end of the stem to an adjusting screw 17 that is threaded into a flange disk 18 held in tight engagement with the casing by any suitable means such as screws 19.

A lock nut 20 is employed to secure the screw 17 in position, and a plug 21 is employed to seal the hole in the lock nut.

At the point of connection between the toggle links, they are pivotally joined to a rod or link 22 which is connected at its other end to the central portion of the diaphragm. The latter is clamped in position by any suitable means such as a flange disk 23, so as to prevent any leakage of fluid from one side of the diaphragm to the other.

A coil spring 24 may be employed to normally hold the diaphragm in the position in which the disk 14 engages the seat 13, although the spring is not absolutely necessary for this purpose.

Passageways 25 place the port 8 in communication with the compartment 5.

In operation, it will be assumed that the pressure in the line 10 is reduced, and pressure in the line 11 tends to return fluid through the valve casing to the source. At such times, the pressure in compartment 5 will rise above that in compartment 6, with the result that the diaphragm will move toward the right and tend to bring the toggle links into alignment, and this will result in the movement of the disk 14 into engagement with the seat 13 for positively preventing any back flow through the pipe 10.

As soon however, as pressure is exerted on the fluid in the line 10, and this pressure is sufficient to overcome the pressure existing in the compartment 5, force will be exerted against the disk 14, and against the right side of the diaphragm (due to the pipe 12), with the result that the link 22 will be shifted toward the left, simultaneously with the movement of the valve disk away from its seat. Consequently, the forced fluid can now pass from 8 through 25 and 5 to the discharge line 11.

Obviously, each time the pressure in 10 falls below that in 11, the valve disk 14 will immediately seat.

Referring to the modification illustrated in Fig. 2, 26 designates the intake pipe which terminates in a valve seat 27, positioned in an intake port 28 of the casing 29. Instead of employing an ordinary flat diaphragm, in this case, I use a sylphon or bellows type partition 30, which segregates a compartment 31 from the compartment 32 of the casing. A branch pipe 33 places the inlet pipe in communication with the compartment 31, and a discharge pipe 34 leads from the port 28 which communicates through passageways 35 with the chamber 32.

A valve disk 36 cooperates with the seat 27 and it is positioned at one end of a stem 37 that is slidably mounted in the casing and is connected by a link 38 to the medial portion of a lever 39. One end of this lever is pivotally connected to a depending fixed support 40, and its other end is pivotally connected to a link 41. That link is pivotally connected to one end of a second lever 42 which has its medial portion pivotally supported by an arm 43 that is fixed to the casing.

A link 44 pivotally connects the other end of the second lever to the diaphragm 30, and if desired, a spring 45 may be used with this diaphragm for normally urging the disk 36 into seating position.

In use, fluid under pressure will be forced from the pipe 26 through the valve structure to the discharge line 34, but as soon as the pressure in 26 falls below that in 34, the diaphragm 30 will be moved toward the wall 46 of the casing, with the result that the levers 42 and 39 will be rocked, and the valve stem 37 will be moved in such direction as to bring the disk 36 into tight engagement with the valve seat. Obviously, back flow will now be prevented by the valve, but as soon as the fluid is again forced through the pipe 26, it will act not alone to lift the valve disk 36, but through the instrumentality of the pipe 34, will function to depress the diaphragm 30, and as the valve opens, the fluid will pass out into the discharge line.

The structure illustrated in Fig. 3 is a somewhat simpler one of the bellows type than that shown in Fig. 2, in that some of the levers and links are eliminated. In this embodiment, the inlet pipe 50 leads into an inlet port 51 of the casing 52. This port, by means of passageways 53, is in constant communication with the compartment 54 that is in constant communication with the discharge line 55. Here also, the inlet pipe terminates in a nozzle 56 that cooperates with a valve disk 57 supported by a slidable stem 58. The upper end of this stem is pivotally connected by a link 59 to one end of a lever 60 that has its medial portion pivotally supported by a post 61 that is fixedly arranged within the casing. A link 62 pivotally connects the opposite end of this lever with the diaphragm 63 which segregates the compartment 64 from the compartment 65. Branch pipe 66 places the compartment 64 in communication with the pipe 50.

In operation, the pressure fluid entering through 50 tends to raise the disk 57, and at the same time, this fluid passes through 66 into the compartment 64 and acts to depress the diaphragm 63, so as to cause the lever 60 to lift the disk, and the fluid flows out of the compartment 65 through the discharge line 55. Now, when pressure is released on the fluid in 50, and the fluid from 55 tends to flow in a reverse direction, the pressure immediately lifts the diaphragm 63 and this causes the closing of the valve and immediately prevents any back flow of the fluid toward the pump or other forcing device.

From the foregoing it will be understood that in actual practice, the invention will consist of a diaphragm separating two chambers, one of which will communicate with the inlet line and the other communicating with the discharge chamber of the valve structure. An ordinary valve seat and valve head of any desired type may be used, but I prefer to employ a valve seat and valve head of the single-seated, fully unbalanced type. When the pressure comes on the inlet line, it simultaneously exerts pressure on the valve head, as well as on the diaphragm, and acts in opposition to the resisting pressure in the discharge line. As soon as the inlet pressure exceeds discharge line pressure by a sufficient amount to overcome the inertia of the parts of the valve and to overcome the spring loading (which may or may not be used), the valve will open and allow the passage of fluid from the inlet to the discharge. When the period of flow is passed, the back flow, which would otherwise occur, will tend to push the valve disk against its seat, and will also act to force the diaphragm back in the opposite direction, both of which effects tend to seat the valve disk firmly on its seat nozzle, thereby effecting a tight seal and absolutely preventing the back flow.

By changing the diameter of the diaphragm and the leverage or ratio of diaphragm travel to valve disk travel, any necessary or desirable pressure of the valve disk on the seat may be arranged and the greater the back pressure or tendency for the fluid to flow in the reverse direction, the greater will be the pressure on the valve head, tending to make a tight shut-off.

The valve seat and disk may be of any desired standard construction, although my preference at the present time is for a stationary inlet nozzle with a flat soft seated valve disk working against the nozzle. I can use composition or soft metal seating material for the valve disk and arrange the contour to allow proper cooperation between the nozzle and the valve seat, at the same time providing for the necessary durability and tightness in service. An ordinary flat or bevel seated metal to metal valve might likewise be used. However, it would undoubtedly not be as tight as the soft metal or composition seat material which has been referred to above.

The movable partition may be a piston or a diaphragm made of any suitable material, such as thin laminated metal sheets, composition sheets, fabric, sheets, leather, balloon cloth, or corrugated cylindrical bellows of the well known sylphon or hydron types. I do not wish to limit myself to any particular movable partition or movable diaphragm, but consider these terms synonymous in the claims, so long as such an element will not permit the flow of liquid or gas from one side to the other, but give a limited but sufficient movement which can be transmitted to the valve mechanism, thereby insuring a progressively tighter seating of the valve disk as the differential pressures tending to backward flow, increase.

In order to provide for automatic closure of the valve at all times, regardless of position, and regardless of the weight offset of the parts of the valve mechanism itself, I prefer to mount a spring in the valve in some position that will always tend to keep the valve disk closed unless the spring tension is overcome by the action of a higher pressure on the inlet side of the valve.

It is obvious that this positive check valve will be useful and valuable not only on gasoline gas machines, but for a great many other applications where positive shut-off against back flow is necessary or desirable.

Instead of using the toggle links 16, shown in Fig. 1, I may use a leaf spring, one end of which will be connected to the post 17 and the other to the stem 15. In such case, the medial portion of the spring will be flexibly connected to the left end of the link 22. This is a somewhat cheaper construction.

While I have disclosed what I now consider to be preferred embodiments of the invention in such manner that the same may be readily understood by those skilled in the art, I am aware that changes may be made in the details disclosed, without departing from the spirit of the invention, as expressed in the claims.

What I claim and desire to secure by Letters Patent is:

1. A check valve of the character described, comprising a first chamber and a second chamber, a movable partition segregating said chambers from one another, an inlet conduit leading into the first chamber and a discharge conduit leading out of said first chamber, a pipe placing the inlet conduit in communication with the second chamber, a valve seat interposed between the inlet conduit and the outlet conduit, a valve head cooperating with the seat for closing off communication between said conduits and between the first chamber and said pipe, said valve closing in a direction toward said inlet conduit, and means positively connecting the valve head to the partition for causing positive seating of the valve head when the pressure in the discharge conduit exceeds the pressure in the inlet conduit and for opening said valve when the pressure in the inlet conduit exceeds the pressure in the discharge conduit, said means functioning to cause the head to move in opposite directions reversely to the diaphragm.

2. A positive check valve comprising first and second chambers, a movable partition segregating said chambers from one another, an inlet conduit leading into the first chamber and terminating in a valve seat, a discharge conduit leading out of the first chamber, a pipe placing the inlet conduit, at a point anterior to the valve seat, in communication with the second chamber, said valve seat being interposed between the inlet conduit and the outlet conduit and comprising with said pipe the only means of communication between said chambers, a valve head cooperating with the seat for closing off communication between the conduits and also communication between the pipe and first chamber, said valve seating in a direction toward the inlet conduit, and means positively connecting the valve head to the partition for causing positive seating of the valve head when the pressure in the discharge conduit exceeds the pressure in the inlet conduit and for moving the valve head, under the influence of the movable partition, away from its seat when the pressure in the inlet conduit exceeds the pressure in the discharge conduit.

3. A positive check valve comprising first and second chambers, a movable partition segregating said chambers from one another, an inlet conduit leading into the first chamber and terminating in a valve seat, a discharge conduit leading out of the first chamber, a pipe placing the inlet conduit, at a point anterior to the valve seat, in communication with the second chamber, said valve seat being interposed between the inlet conduit and the outlet conduit and comprising with said pipe the only means of communication between said chambers, a valve head cooperating with the seat for closing off communication between the conduits and also communication between the pipe and first chamber, said valve seating in a direction toward the inlet conduit, and means positively connecting the valve head to the partition for causing positive seating of the valve head when the pressure in the discharge conduit exceeds the pressure in the inlet conduit and for moving the valve head, under the influence of the movable partition, away from its seat when the pressure in the inlet conduit exceeds the pressure in the discharge conduit, said means including a stem for the head, pivotally connected toggle links, an anchor element for one end of one of the toggle links, said stem being pivotally connected to one end of the other toggle link, and a link connecting the partition to the toggle links at the point where they are connected together, said element being axially adjustable.

4. A positive check valve comprising first and second chambers, a movable partition segregating said chambers from one another, an inlet conduit leading into the first chamber and terminating in a valve seat, a discharge conduit leading out of the first chamber, a pipe placing the inlet conduit, at a point anterior to the valve seat, in communication with the second chamber, said valve seat being interposed between the inlet conduit and the outlet conduit and comprising with said pipe the only means of communication between said chambers, a valve head cooperating with the seat for closing off communication between the conduits and also communicaton between the pipe and first chamber, said valve seating in a direction toward the inlet conduit, means positively connecting the valve head to the partition for causing positive seating of the valve head when the pressure in the discharge conduit exceeds the pressure in the inlet conduit and for moving the valve head, under the influence of the movable partition, away from its seat when the pressure in the inlet conduit exceeds the pressure in the discharge conduit, and a spring cooperating with the partition and tending to hold the valve head in seated position, said spring functioning to move the partition in a direction away from said seat.

5. A positive check valve comprising first and second chambers, a movable partition segregating said chambers from one another, an inlet conduit leading into the first chamber and terminating in a valve seat, a discharge conduit leading out of the first chamber, a pipe placing the inlet conduit, at a point anterior to the valve seat, in communication with the second chamber, said valve seat being interposed between the inlet conduit and the outlet conduit and comprising with said pipe the only means of communication between said chambers, a valve head cooperating with the seat for closing off communication between the conduits and also communication between the pipe and first chamber, said valve seating in a direction toward the inlet conduit, and means positively connecting the valve head to the partition for causing positive seating of the valve head when the pressure in the discharge conduit exceeds the pressure in the inlet conduit and for moving the valve head, under the influence of the movable partition, away from its seat when the pressure in the inlet conduit exceeds the pressure in the discharge conduit, said means including a support arranged in the first chamber, a rocking lever having its medial portion pivotally connected to said support, means connecting one end of the lever to the partition and means connecting the other end of the lever to the valve head.

6. A positive check valve comprising first and second chambers, a movable partition segregating said chambers from one another, an inlet conduit leading into the first chamber and terminating in a valve seat, a discharge conduit leading out of the first chamber, a pipe placing the inlet conduit, at a point anterior to the valve seat, in communication with the second chamber, said valve seat being interposed between the inlet conduit and the outlet conduit and comprising with said pipe the only means of communication between said chambers, a valve head cooperating with the seat for closing off communication between the conduits and also communication between the pipe and first chamber, said valve seating in a direction toward the inlet conduit, and means positively connecting the valve head to the partition for causing positive seating of the valve head when the pressure in the discharge conduit exceeds the pressure in the inlet conduit and for moving the valve head, under the influence of the movable partition, away from its seat when the pressure in the inlet conduit exceeds the pressure in the discharge conduit, said means including supporting arms arranged in one of said chambers, a lever having one of its ends connected to one of said supporting arms, means connecting the medial portion of said lever to the valve head, a second lever having its medial portion pivotally supported by the other one of said arms, a link connecting one end of the second lever to an end of the first mentioned lever, and another link connecting the other end of the second lever to said partition.

ROSSWELL W. THOMAS.